July 22, 1969     A. V. SPARR, SR     3,456,590
HOSE CONTROLLED SWITCH FOR MILK TRANSFER SYSTEMS
Filed Sept. 6, 1967     3 Sheets-Sheet 1
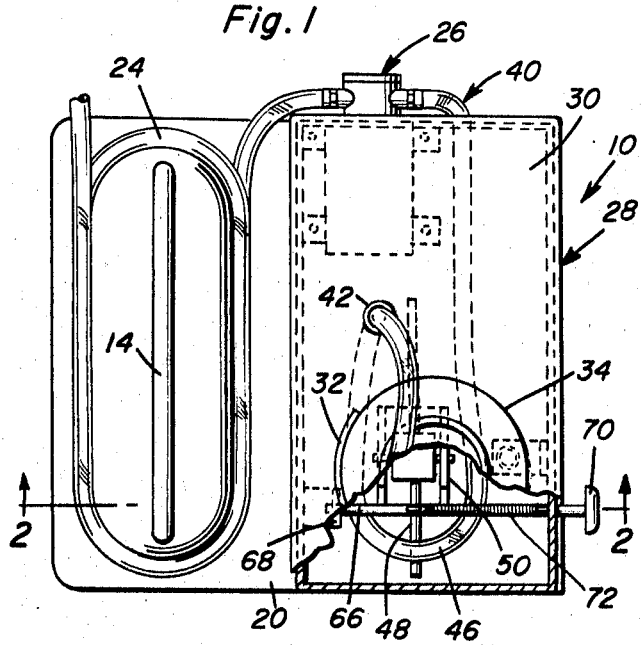
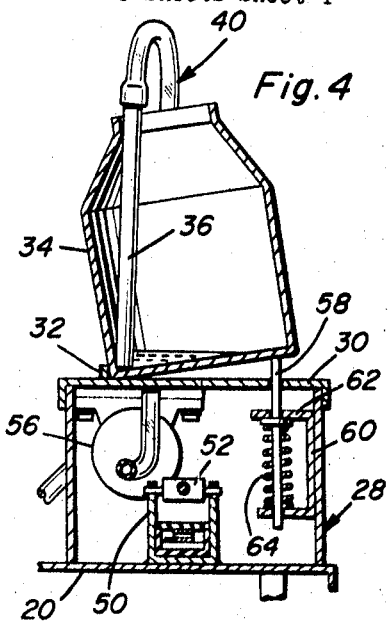
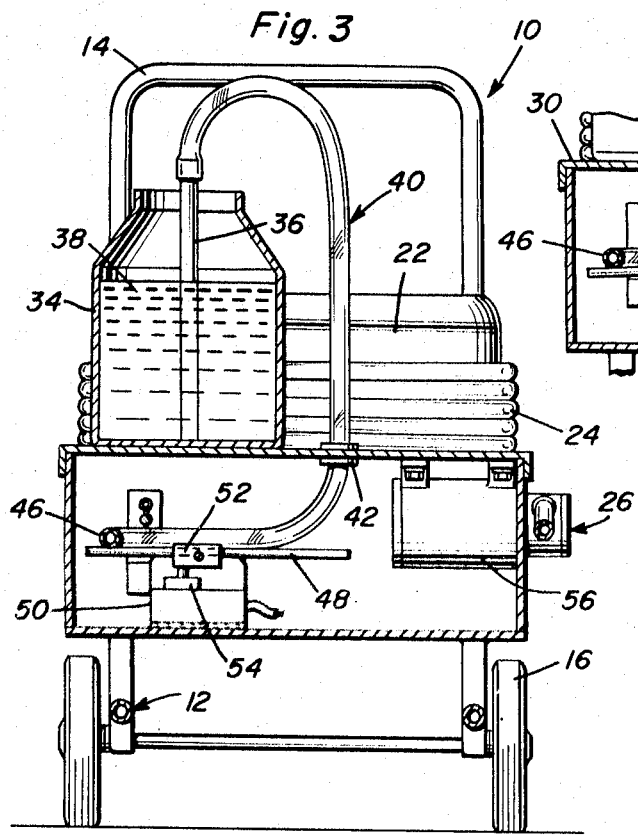
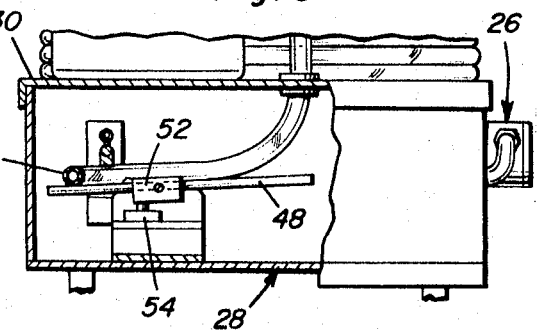
Anders V. Sparr, Sr.
INVENTOR.
BY Clarence A. O'Brien
and Harvey B. Jacobson
Attorneys July 22, 1969     A. V. SPARR, SR     3,456,590
HOSE CONTROLLED SWITCH FOR MILK TRANSFER SYSTEMS
Filed Sept. 6, 1967     3 Sheets-Sheet 2

Anders V. Sparr, Sr.
INVENTOR.

July 22, 1969  A. V. SPARR, SR  3,456,590
HOSE CONTROLLED SWITCH FOR MILK TRANSFER SYSTEMS
Filed Sept. 6, 1967  3 Sheets-Sheet 3
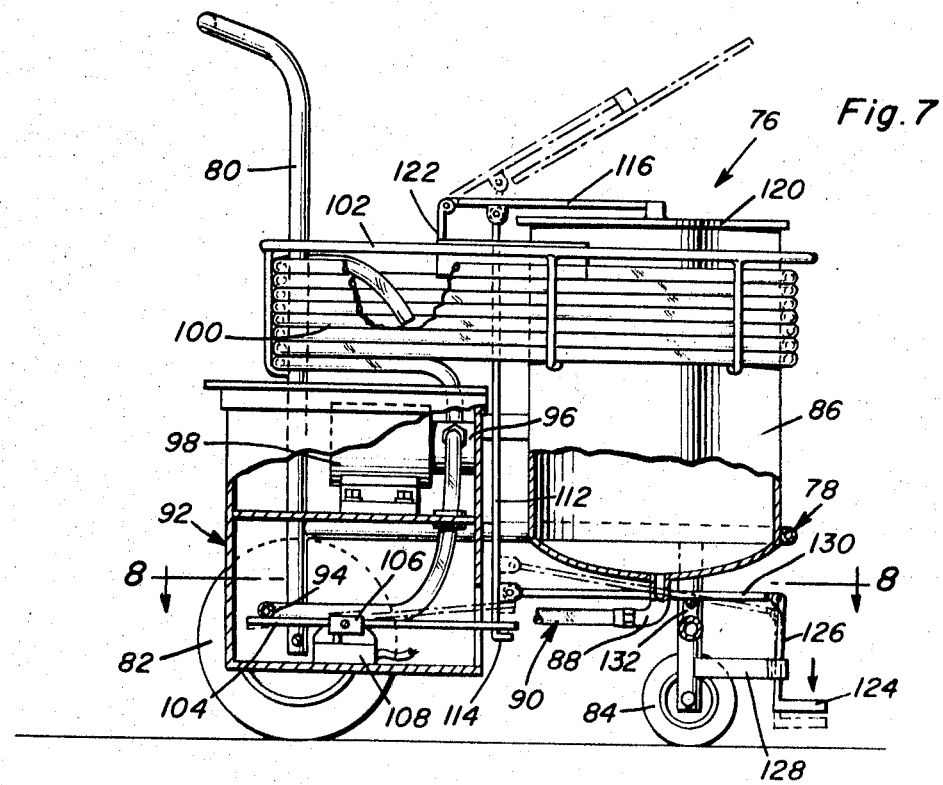
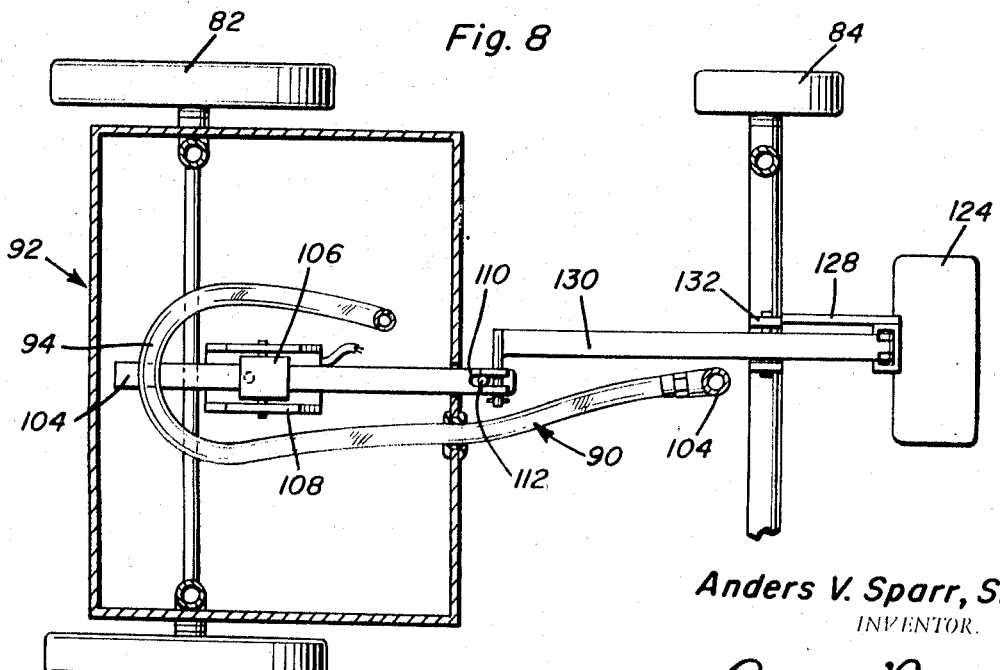
Anders V. Sparr, Sr.
INVENTOR.

United States Patent Office 3,456,590
Patented July 22, 1969

3,456,590
HOSE CONTROLLED SWITCH FOR MILK TRANSFER SYSTEMS
Anders V. Sparr, Sr., Rte. 2, Waupun, Wis. 53963
Filed Sept. 6, 1967, Ser. No. 665,902
Int. Cl. F04b *49/02;* F04d *15/02;* A01j *9/00*
U.S. Cl. 103—25                                   9 Claims

ABSTRACT OF THE DISCLOSURE

A weight-sensing actuator for a switch through which operation of a pump is controlled to transfer milk from the container on a mobile cart to a storage tank. The milk is withdrawn from the container through a flexible hose having a loop portion supported on the actuator so that the weight of the milk flowing through the loop portion maintains the switch closed and the pump operating.

---

This invention relates to milk transfer systems and more particularly to control over the motor operated pump through which milk is withdrawn from a container on a mobile cart for transfer to a storage tank.

Milk transfer systems of the type with which the present invention is associated, usually involve a mobile cart moved from one stall to another within a milking parlor and supporting a milk container so that milk obtained by automatic milking equipment for example, may be transferred from the container to a milk collecting storage tank. The transfer of milk from the cart mounted container to the storage tank is effected by means of a motor operated pump mounted on the mobile cart. Various control devices are provided for this pump in order to start its operation and stop operation when all of the milk from the container has been withdrawn.

The pump control devices utilized in milk transfer systems referred to, have had serious drawbacks. For example, float operated devices which sense the level of milk within the container are likely to contaminate the milk. Control devices for sensing the weight of the container on the other hand are relatively large, cumbersome and expensive. Photosensing devices for detecting the presence of milk flowing through the suction hose have also been utilized such as disclosed in my prior Patent No. 3,329,126. However, such photosensing control devices were not operationally reliable and involved switching delays because of variations in the butter fat content of the milk which affected the light transmissivity and detection of milk within the suction hose.

In accordance with the present invention, a different approach is taken to the sensing of the presence of milk within the suction hose in order to control operation of the motor operated pump. The suction hose which is flexible, is provided with a slack loop portion supported on an actuating lever which thereby senses the weight of the loop portion in order to hold a motor control switch closed as long as milk is present within the loop portion of the suction hose. In this fashion, a relatively small weight responsive switch actuator may be utilized, the sensitivity of which is adjustable more readily. Also, by virtue of the foregoing arrangement, a much simpler and efficient pump starting device may be utilized in order to initiate operation of the pump.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of milk transfer cart constructed in accordance with the present invention with parts broken away and shown in section.

FIGURE 3 is a transverse sectional view taken substantially through a plane indicated by section line 3—3 in FIGURE 2.

FIGURE 4 is a partial side sectional view showing the milk container supported on the cart in a tilted position after most of the milk has been withdrawn therefrom.

FIGURE 5 is a partial front elevational view of the milk transfer cart with parts broken away and shown in section.

FIGURE 7 is a side elevational view with parts broken away and shown in section of another form of milk transfer cart constructed in accordance with the present invention.

FIGURE 8 is a top sectional view taken substantially through a plane indicated by section line 8—8 in FIGURE 7.

Figure 2:
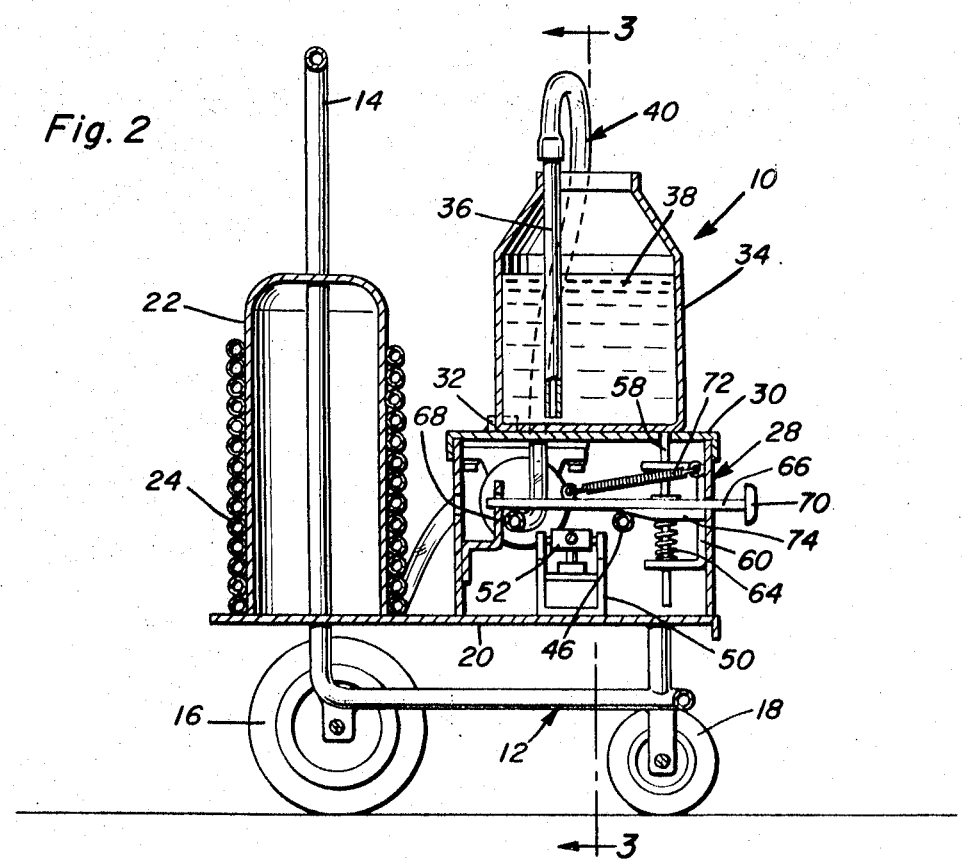
FIGURE 2 is a side sectional view taken substantially through a plane indicated by section line 2—2 in FIGURE 1.

Referring now to the drawings in detail, FIGURES 1, 2 and 3 illustrate a mobile milk transfer cart generally referred to by reference numeral 10. The cart includes a supporting frame 12 connected to a vertical handle 14 at a rear end extending upwardly from a pair of rear wheels 16 rotatably mounted by the frame. The frame also mounts a pair of forward wheels 18 and supports a platform 20 on which an oblong supporting drum 22 is mounted through which the handle 14 extends. Flexible tubing 24 is coiled about the drum 22 for storage purposes. One end of the tubing 24 is connected to the discharge side of a pump 26 mounted on one end on a control box 28 which is also supported on the platform 20. The control box is provided with a closure lid 30 having an arcuate guide 32 fixed thereto as by welding so as to position a conventional type of milk reservoir container 34 on top of the lid. A dip tube 36 is adapted to be inserted into the container in order to withdraw milk 38 therefrom. The upper end of the dip tube 36 is connected to a flexible suction conduit generally referred to by reference numeral 40 which extends downwardly into the control box 28 through a grommetted opening 42 in the closure lid 30, the suction conduit emerging from one end of the control box and connected to the suction side of the pump 26.

Figure 6:
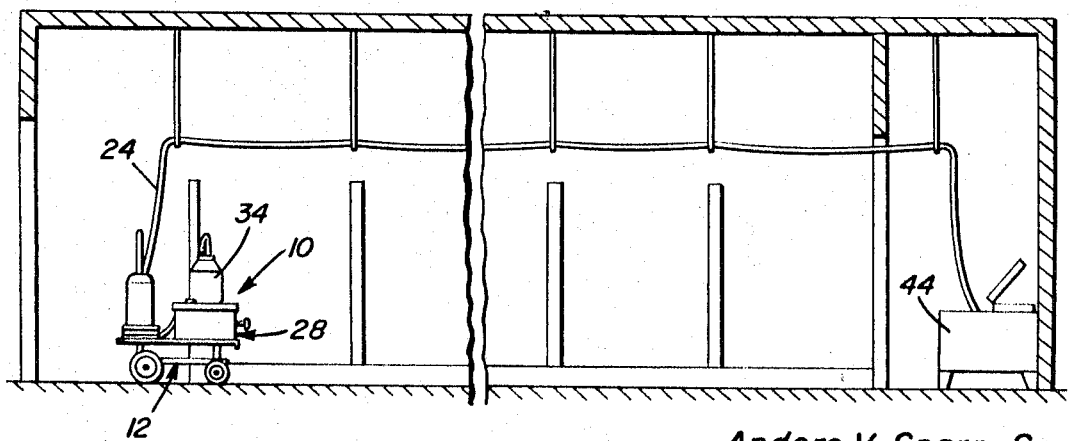
FIGURE 6 is a schematic view of the milk transfer system with which the milk transfer cart is associated.

Facilities are mounted within the control box for controlling operation of the pump 26 so that when the pump is operative, milk 38 within the container 34 will be transferred through the tubing 24 to a storage tank 44 as shown in FIGURE 6 and as more fully explained in my prior Patent No. 3,329,126 aforementioned. However, the contribution of the present invention resides in the facilities enclosed within the control box 28 for controlling operation of the pump 26.

As more clearly seen in FIGURES 1, 3 and 5, the flexible suction conduit 40 includes a slack loop portion 46 supported within the control box on an actuator lever element 48. A pivotal supporting bracket 50 is fixedly mounted within the control box to pivotally mount a pivot block 52 through which the lever element 48 extends. The lever element is slidably displaceable relative to the pivot block 52 so as to adjustably balance the lever element when supporting an empty loop portion 46 in an inactive position relative to a microswitch device 54 fixedly mounted within the pivot bracket 50 as shown in FIGURE 3. It will be apparent therefore, that when milk is within the loop portion 46 of the flexible conduit 40, it will downwardly displace the actuator lever element 58 to a position as shown in FIGURE 5 causing the pivot block 50 to actuate the microswitch device 54. The microswitch device 54 is wired to the pump motor 56 suspended from the closure member 30 within the control box so as to drive the pump 26. Actuation of the switch 54 thereby maintains the pump 26 operating as long as milk is present within the loop portion 46 of the suction conduit. When all of the milk is withdrawn from the container 34 and milk is no longer within the loop portion 46 of the suction conduit, the actuator lever element 48 returns to its inactive position shown in FIGURE 3 operatively spaced from the switch device 54 so as to interrupt the energizing circuit for the pump motor 56 to stop operation of the pump 26.

As the milk container 34 is being evacuated, and the weight of its contents is reduced below a predetermined value, the container is tilted to a position as shown in FIGURE 4 so that the milk may be more completely withdrawn from the container through the bottom of the dip tube 36. Toward this end, a vertical tilting rod 58 is slidably mounted by a bracket 60 secured to the control box in a proper position so that the rod may project upwardly through an opening therein to engage the bottom of the milk container 34. A thrust washer 62 is secured to the rod 58 within the bracket 60 so that a coil spring 64 mounted on the rod within the bracket may upwardly bias the rod. When the container 34 is substantially full as shown in FIGURE 2, the weight of the container and its contents will overcome the bias of the spring 64. Thus, the spring 64 will tilt the container through the tilting rod 58 only when the weight of its contents has been reduced below a predetermined amount.

After a full container of milk is placed on the closure member 30 and the dip tube 36 is inserted, operation of the pump must be initiated since no milk will then be in the loop portion 46. Toward this end, a control rod 66 is slidably mounted for transverse displacement through the control box across the top of the loop portion 46 as more clearly seen in FIGURES 1 and 2. Aligned openings are accordingly provided in the side walls of the control box which are also aligned with an opening in a slide bracket 68 which supports the control rod within the control box. The end of the control rod outside of the control box may be provided with a push knob 70 adapted to be engaged by the knee of an operator for example so as to inwardly displace the control rod 66 against the bias of a return spring 72 the opposite ends of which are connected to the control rod and the control box. Mounted on the control rod and depending therefrom is a cam element 74 adapted to engage the loop portion 46 of the suction conduit deflecting it downwardly in response to inward displacement of the control rod against the bias of the return spring 72. Thus, when the loop portion 46 is downwardly displaced in this fashion it will also downwardly pivot one end of the actuator level element 48 so as to actuate the motor control switch 54 initiating operation of the pump 26. Once the pump is operating and milk is conducted through the suction conduit 40, the weight of the milk within the loop portion 46 will hold the switch device 54 in its actuated position in order to maintain operation of the pump after the control rod 66 is released.

FIGURES 7 and 8 illustrate another form of milk transfer cart generally referred to by reference numeral 76. The cart 76 also includes a frame assembly 78 having a handle 80 attached to the rear end thereof below which the rear wheels 82 are rotatably mounted. Permanently mounted on the frame assembly above the forward wheels 84, is a milk container 86 into which milk is adapted to be poured. The bottom of the container 86 is provided with an outlet elbow 88 connected to one end of a suction conduit 90 which extends into a control box 92. The conduit 90 includes a loop portion 94 similar to the loop portion 46 hereinbefore described in connection with the milk transfer cart 10 of FIGURES 1–5. Thus, the suction conduit including the loop portion is connected to the suction side of a pump 96 driven by the motor 98. The discharge side of the pump 96 is connected to the flexible tubing 100 adapted to be stored in coil form on the circular reel frame 102 encircling the container 86 and the handle 80 to which the reel frame is secured as by welding.

Similar to the control arrangement hereinbefore described in connection with the milk transfer cart 10, the loop portion 94 is supported on an actuator lever element 104 pivotally mounted by means of the pivot block 106 on a pivot bracket 108 secured to the bottom of the control box 92, the bracket 108 also supporting a switch device for energizing the motor 98 when the actuator lever element 104 is downwardly displaced by the weight of the milk within the loop portion 94 of the suction conduit 90. Unlike the arrangement hereinbefore described in connection with the milk transfer cart 10. the actuator lever element 104 extends outwardly of the control box 92 and is provided with an elongated slot 110 through which a vertically disposed connecting rod 112 extends. The lower end of the connecting rod is provided with an engaging portion 114 while the upper end of the connecting rod is pivotally connected to a pivoted supporting arm 116 to which a closure member 120 is connected. The supporting arm 116 is pivotally mounted by a pivot bracket 122 secured to the container 86 in order to support the closure member 120 in a position closing the open upper end of the container as shown by solid line in FIGURE 7. Thus, when the connecting rod 112 is upwardly displaced, the closure member 120 is pivoted to the open position shown by dotted line in FIGURE 7. Upward displacement of the connecting rod 112 also upwardly displaces the end portion of the actuator lever 104 projecting from the control box so as to actuate the motor controlling switch in order to start operation of the pump 96.

The operator may thereby start operation of the pump and at the same time open the closure member 120 for filling the container with milk by downwardly depressing the pedal 124 extending forwardly from the cart 76. The pedal is connected to the lower end of an arm 126 extending through a guide bracket 128 secured to the frame. The upper end of the arm 126 is pivotally connected to one end of a lever member 130, the opposite end of which is pivotally connected to the vertical connecting rod 112. The lever member is pivotally mounted by the pivot bracket 132 on the frame. Thus, downward depression of the pedal 124 will upwardly displace the connecting rod 112 against gravitational bias in order to open the closure member 120 and start operation of the pump as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a supporting frame, a container supported on the frame and a motor-operated pump, a fluid transfer system including suction conduit means connected to said pump for withdrawing fluid from the container, a switch device for controlling operation of said pump, switch actuating means responsive to the weight of fluid in said suction conduit means for maintaining operation of the pump as long as fluid is being withdrawn from the container, and selectively controlled starting means engageable with the actuating means for initiating operation of the pump.

2. The combination of claim 1 wherein said conduit means includes a flexible loop portion supported by the actuating means.

3. The combination of claim 2 wherein said actuating means includes a lever element engageable with the switch device and supporting the loop portion of the conduit means thereon, and pivot means mounting the lever element on the frame in a balanced position spaced from the switch device when the loop portion of the conduit means is empty.

4. The combination of claim 3 wherein said conduit means further includes a dip tube inserted into the container and tilting means mounted by the frame for tilting of the container in response to reduction in weight of the container and the contents thereof below a predetermined value.

5. The combination of claim 4 wherein said starting means comprises a push rod movably mounted by the frame, cam means mounted on the rod for engagement with said loop portion of the conduit means upon displacement of the rod to actuate the switch device.

6. The combination of claim 1 wherein said actuating means includes a lever element engageable with the switch device and supporting the conduit means thereon, and pivot means mounting the lever element on the frame in a balanced position spaced from the switch device when the conduit means is empty.

7. The combination of claim 6 including a closure member for the container and means connecting the starting means to the closure member for opening the same when actuating the starting means.

8. The combination of claim 7 wherein said starting means comprises a pedal operated linkage connected to the closure member and engageable with the lever element.

9. The combination of claim 8 wherein said conduit means includes a flexible loop portion supported on the lever element.

References Cited

UNITED STATES PATENTS

| | | | |
|---|---|---|---|
| 3,198,122 | 8/1965 | Lippke et al. | 103—25 |
| 3,251,303 | 5/1966 | Mason et al. | 103—25 |
| 3,329,126 | 8/1967 | Sparr | 103—25 |
| 1,883,266 | 10/1932 | Yoder | 103—26 |

HENRY F. RADUAZO, Primary Examiner

U.S. Cl. X.R.

119—14.11; 200—61.2